Nov. 16, 1937.   G. H. HUFFERD   2,099,209
LUBRICATED RUBBER JOINT
Filed April 11, 1935
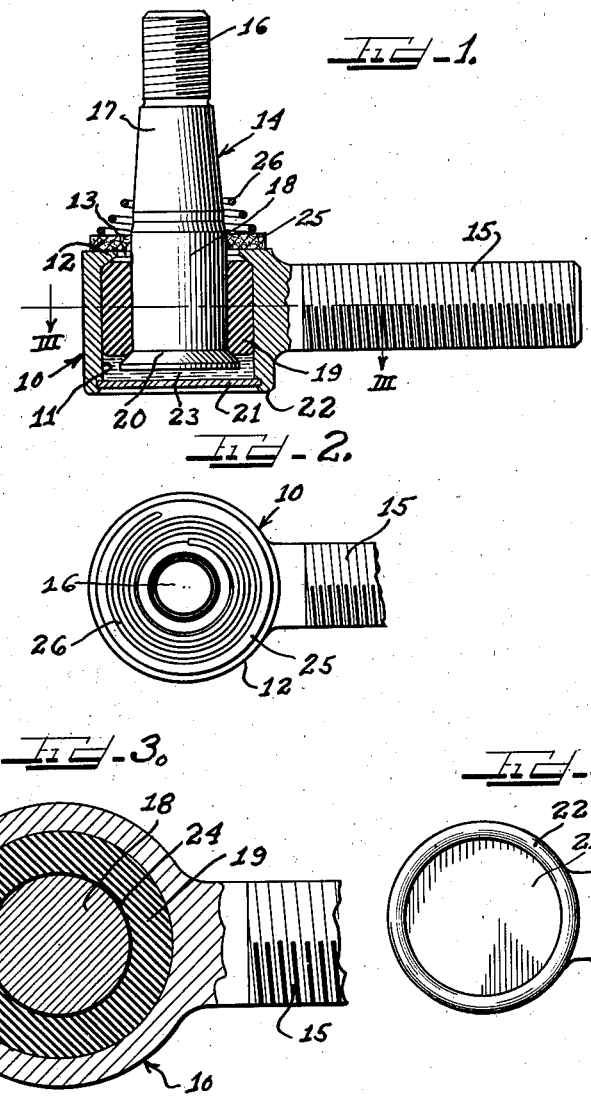
Inventor
George H. Hufferd.
by Charles H. Sill Attys.

Patented Nov. 16, 1937

2,099,209

UNITED STATES PATENT OFFICE 2,099,209

LUBRICATED RUBBER JOINT

George H. Hufferd, Detroit, Mich., assignor to Thompson Products, Incorporated, Cleveland, Ohio, a corporation of Ohio Application April 11, 1935, Serial No. 15,797

5 Claims. (Cl. 287—93)

This invention relates to joints having a stud member mounted in a housing by means of a resilient bushing which is separately maintained from the joint and housing by a lubricant which does not swell or deteriorate the bushing material.

More specifically this invention relates to tie rod and drag link joints having a stud member resiliently supported by a rubber bushing encased in a socket member which is provided with a lubricant chamber for lubricating the stud to prevent vulcanization thereof to the rubber bushing.

Tie rod joints have heretofore been provided with rubber bushings for resiliently mounting stud members thereof in the socket member. During use of these joints, however, the rubber bushings eventually become vulcanized to the stud member and to the housing, thereby preventing free movement of the stud member relative to the housing. It was therefore necessary to incorporate bearing sleeves between the stud member and the rubber bushing to provide free bearing relation of the stud relative to the socket. The provision of liner sleeves, and the like, not only increases the cost of this type of joint but also introduces additional wearable elements into the joint.

I have now provided a joint structure in which the stud member may be directly mounted in a rubber bushing without danger of the bushing being vulcanized to the stud. In accordance with my invention, I provide a chamber or reservoir for a lubricant which does not swell or deteriorate the rubber bushing. A suitable type of lubricant for this purpose is castor oil. The castor oil coats the cooperating surfaces of the rubber bushing and stud, as well as the rubber bushing and housing, with a lubricating film and thereby prevents vulcanization of the rubber to the stud or housing. At the same time castor oil will not deteriorate or swell the rubber.

It should be understood, of course, that other types of lubricant may be used providing the same do not affect the bushing material. Furthermore, resilient materials other than rubber may be used. Examples of suitable substitutes for rubber are synthetic rubber compositions, such as duprene, chloroprene, and the like polymers of isoprene which have been reacted with chlorine. These synthetic rubbers are not softened or deteriorated by ordinary lubricants, such as petroleum oil, and when these materials are used it is not necessary to use castor oil as a lubricant.

The term "rubber" as used hereinafter and in the claims, therefore, includes both natural rubber and synthetic rubber compositions.

It is then, an object of this invention, to prepare a joint having a stud member directly mounted in a resilient bushing and maintained in separate relation from said bushing by a lubricating material which does not deteriorate the bushing material.

A further object of this invention is to provide a tie rod joint having a stud member universally mounted in a housing by means of a lubricated rubber bushing.

A specific object of this invention is to provide a tie rod or drag link joint having a stud member universally mounted in a socket solely by means of a rubber bushing and providing a reservoir for lubricant to prevent vulcanization of the bushing to the socket or stud.

Other and further objects of this invention will be apparent to those skilled in the art from the following detailed description of the annexed sheet of drawings which discloses a preferred embodiment of the invention.

On the drawing:

Figure 1 is a side elevational view, partly in cross section, showing the joint of this invention with a reservoir or pool of lubricant in the joint housing.

Figure 2 is a top plan view of the joint shown in Fig. 1.

Figure 3 is an enlarged cross sectional view with a part in elevation, taken substantially along the line III—III of Fig. 1.

Figure 4 is a bottom plan view of the joint shown in Fig. 1.

As shown on the drawing:

The reference numeral 10 indicates generally the housing member having a cylindrical bore 11 extending therethrough and an inturned flange 12 at one end thereof defining an annular opening 13 through which a stud member 14 freely extends. The housing member 10 also is provided with an integral laterally extending threaded shank portion 15 at right angles to the bore 11. The shank portion 15 is adapted to be threaded into the end of a tie rod or drag link.

The stud 14 preferably comprises a threaded end 16 for receiving a nut thereon, a tapered portion 17 for receiving the boss of a connecting link thereon, a cylindrical bearing portion 18 for receiving the resilient bushing 19 therearound and a flared end or head 20 extending below the bushing 19 to prevent the stud from being pulled through the bushing.

The bushing 19, as pointed out above, may be formed of any suitable resilient material, such as rubber or rubber substitute. This bushing 19 is held under compression between the bearing portion 18 of the stud and the cylindrical wall of the housing member 10.

In accordance with this invention, the housing 10 is provided with a chamber or reservoir below the bushing 19 which is sealed from the atmosphere by a closure plate 21 which is spun into the housing walls by peening over the ends of the walls as shown at 22. Before the closure plate 21 is inserted, however, this portion of the housing is filled with a lubricant, such as castor oil indicated by the reference numeral 23. The closure plate is then spun into position to form a fluid tight seal for the lubricant. Because the rubber bushing 19 is maintained under compression between the stud and socket, the lubricant is confined to that chamber defined by the bottom of the bushing 19, the closure plate 21 and the cylindrical wall of the housing 10. During use of the joint, however, the lubricant 23 is worked up between the bearing surface 18 of the stud and the bushing 19 to form a film of lubricant 24 such as is illustrated in Fig. 3. This film of lubricant 24 prevents vulcanization of the rubber bushing 19 to the stud portion 18.

To a lesser degree some of the lubricant 23 will also work up between the bushing 19 and the walls of the housing member 10 and thereby prevent the bushing from being vulcanized to the housing member.

The joint may be sealed from the ingress of dirt by means of the usual felt washer 25 which is held against the inturned flange 12 of the housing 10 by means of a coiled spring 26 disposed around the stud 14. The washer 25 snugly engages the bearing portion 18 of the stud 14 to cover the annular opening 13 of the housing member. At the same time since the washer is movable with the stud portion it does not interfere with the movement of the stud 14 during use.

From the above description it is obvious that I have devised a simple form of joint structure in which a stud member is universally mounted in a housing by means of a resilient bushing which is prevented from becoming vulcanized to the stud member by a lubricant supplied from a reservoir in the housing.

Having now described my invention, I claim:

1. A universal joint comprising a housing having a cylindrical bore extending therethrough and an inturned flange at one end thereof defining a restricted annular opening, a stud extending freely through said opening having a cylindrical bearing portion disposed in said bore, a resilient bushing disposed in bearing contact around said bearing portion and held under compression by said housing walls, a head portion on said stud to prevent the stud from being pulled out of said bushing, a closure plate for said housing spaced from said stud head to define with the stud head and housing walls a fluid tight chamber and castor oil in the chamber.

2. A universal joint comprising a housing having a cylindrical bore extending therethrough, said housing being provided with an inturned portion at one end of said bore defining a restricted opening to the housing, a stud extending through said opening in spaced relation therefrom and having a cylindrical bearing portion in the housing, a resilient bushing interposed between the cylindrical bearing portion of the stud and the housing wall, said bushing being in abutting relation to said inturned portion of the housing, an enlarged portion at the end of the stud abutting the base of the bushing to prevent withdrawal of the stud from the housing, a closure member secured to said housing for closing the bore, said member being in spaced relation from the base of the bushing to define a lubricant reservoir in the housing whereby lubricant supplied from the reservoir provides for free rotation of the stud about its own axis within the bushing and the resiliency of the bushing provides for relative tilting movement of the stud and housing.

3. A lubricated joint comprising a housing having a bore extending therethrough and an inturned portion at one end of the bore defining a restricted opening to the housing, a stud extending freely through said opening having a bearing portion circular in cross-section disposed in the bore, a resilient bushing disposed in bearing contact around the bearing portion of the stud and interposed between the stud and the housing wall defining the bore, said bushing being retained in the bore by the inturned portion at the end of the bore, a head portion on said stud to prevent the stud from being pulled out of the bushing, a closure member spaced from the stud head to define with the end of the stud head and housing wall a fluid tight chamber and a fluid lubricant in said chamber whereby lubricant supplied from the chamber provides for free rotation of the stud about its own axis within the bushing.

4. A lubricated rubber joint comprising a housing having a bore extending therethrough and an inturned portion at one end of the bore defining a restricted opening to the housing, a stud extending freely through said opening having a cylindrical bearing portion disposed in said bore, a rubber bushing interposed between said stud bearing portion and said housing in abutting relation to the inturned portion of the housing, a head portion on said stud adapted to engage the base of the rubber bushing for retaining the stud in the housing, a closure plate for said housing spaced from said stud head to define with the stud head, rubber bushing, and housing wall, a fluid-tight chamber and a fluid lubricant in said chamber.

5. A lubricated joint comprising a housing having an opening giving entrance thereto, a resilient bushing in said housing, means in said housing retaining the bushing therein, a stud extending through said housing opening having a bearing portion seated in said bushing in the housing in rotatable relation thereto, means on said stud retaining the bearing portion thereof in the bushing and a fluid lubricant sealed in said housing by said bushing for lubricating the bearing portion of the stud whereby rotative movements of the stud about its own axis are facilitated by the lubricant and tilting movements of the stud relative to the housing are accommodated by the resiliency of the bushing.

GEORGE H. HUFFERD.